June 7, 1949. J. A. ARWOOD 2,472,059
FISHING ROD HOLDER
Filed June 11, 1946 2 Sheets-Sheet 1
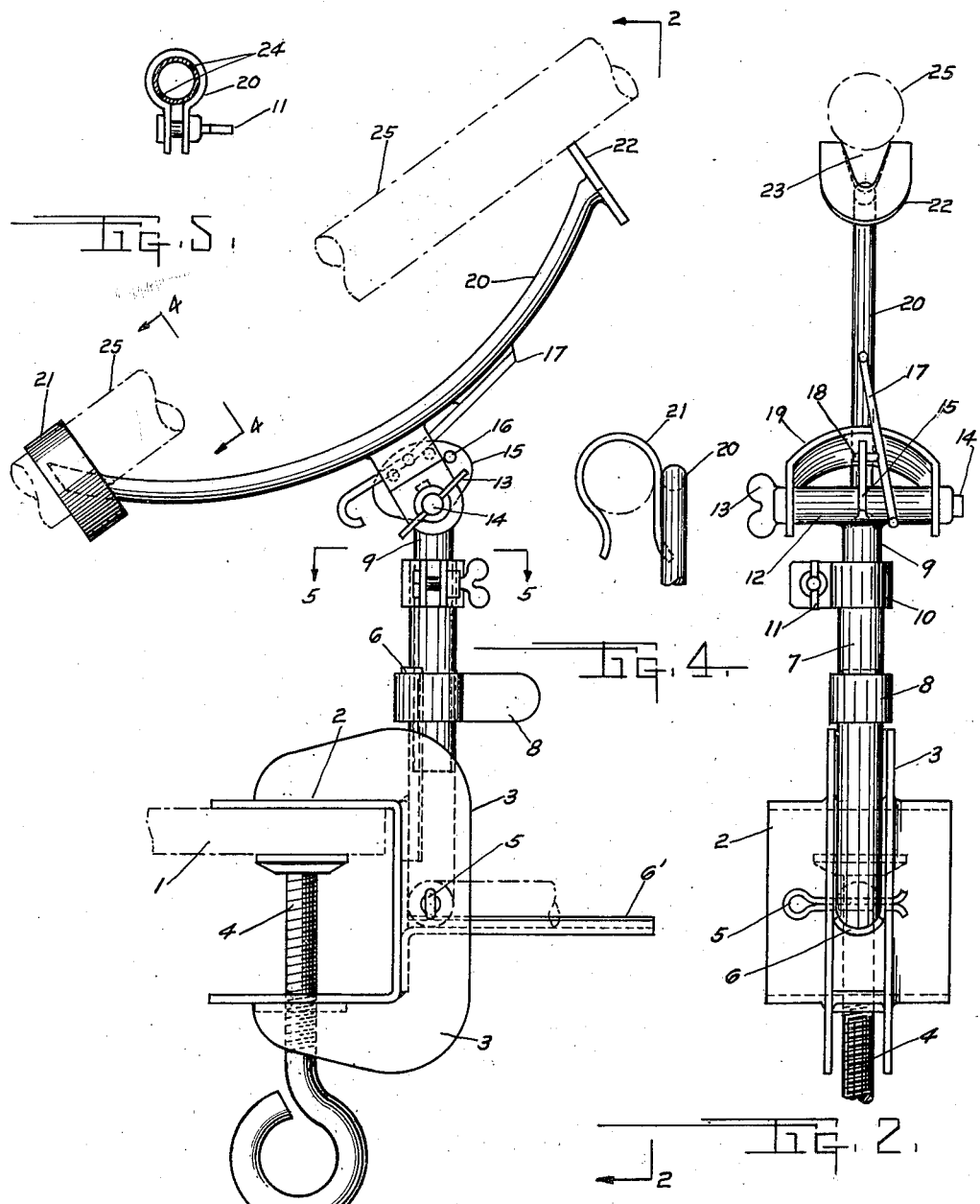
INVENTOR.
James A. Arwood
BY Chas. Denegre
Attorney.

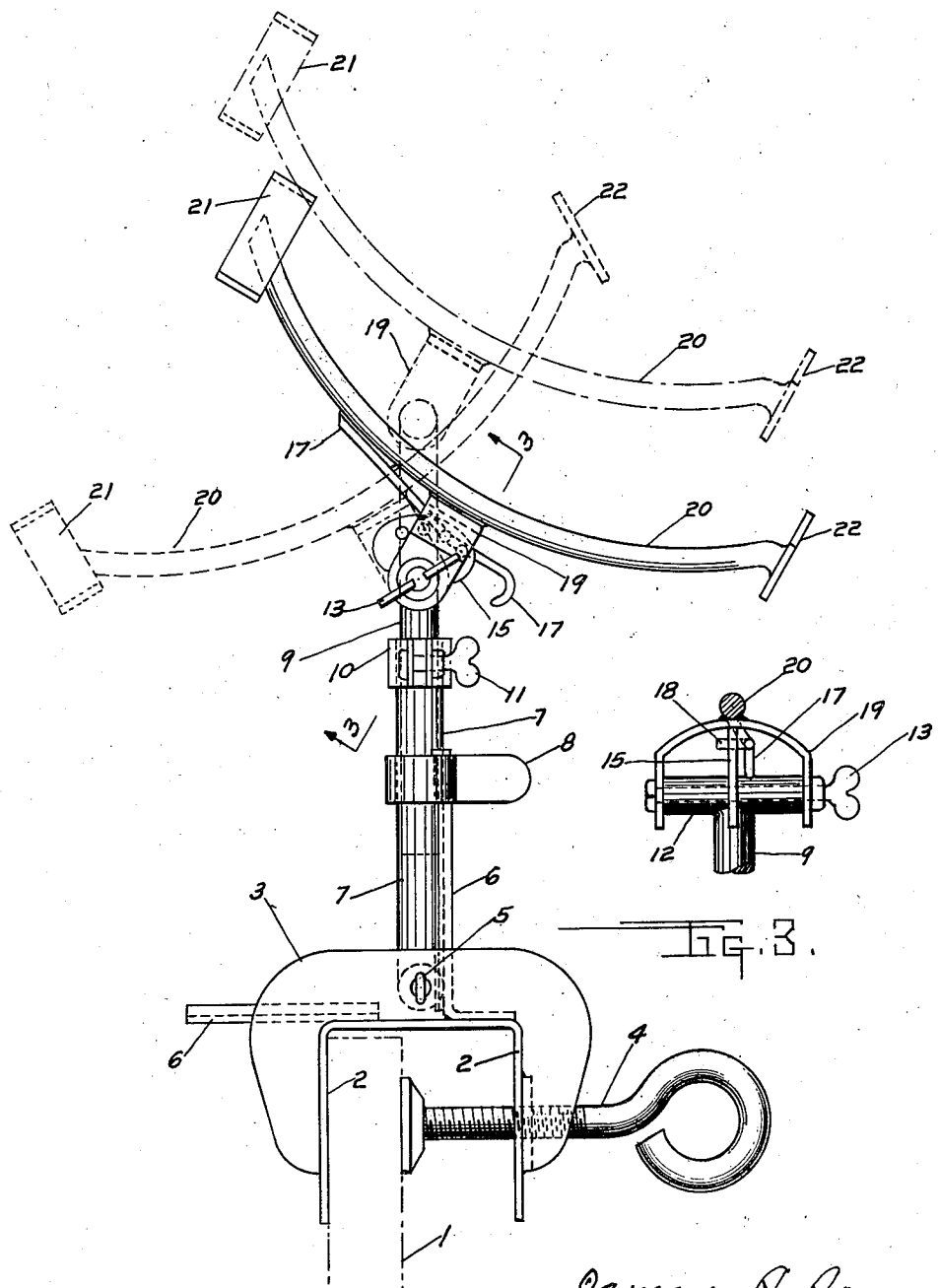

Patented June 7, 1949

2,472,059

UNITED STATES PATENT OFFICE 2,472,059

FISHING ROD HOLDER

James A. Arwood, Birmingham, Ala.

Application June 11, 1946, Serial No. 676,026

1 Claim. (Cl. 248—42)

This invention relates to a fishing rod holder and has for its main objects to provide such a support that will be suitable for holding the rod in different positions, easily attachable to the side or seat of a small boat, or to a pier, and so constructed that the rod may be quickly placed in the holder or removed therefrom. Other advantages will appear from the drawing and description.

By referring generally to the drawings, part of this application, it will be observed that Fig. 1 is a side elevational view of the rod holder assembly with rod position indicated in broken lines; Fig. 2 is a front view on line 2—2 of Fig. 1; Fig. 3 is a detail view on line 3—3 of Fig. 6; Fig. 4 is a detail view on line 4—4 of Fig. 1; Fig. 5 is a detail view on line 5—5 of Fig. 1; and Fig. 6 is a general side elevational view showing the adjustable top member of the holder in different positions.

Similar reference numerals refer to similar parts throughout the several views.

Referring to the drawings in detail it will be seen that the holder may be attached to the seat 1 or side 1' of a boat, or any other object that the clamp will fit. The device comprises the clamp 2 that has a groove formed by its curved body 3. A suitable clamping screw 4 is adapted to attach the clamp. The groove is provided with an integral upright extension 6 and a horizontal extension 6' to take care of different positions. A tube 7 with slits 24 in its top end is swingably mounted upon a pin 5 in the groove in the body of the clamp 2. A collar with a handle 8 is adapted to snugly hold the tube 7 adjacent the upright extension 6 or against the horizontal extension 6' depending on the position of the clamp. There is another tube 9 that is slidable in the tube 7, and a clamp 10 with a wing nut 11 that is adapted to hold the tube 9 in any position up or down in the tube 7. Tube 9 is provided with an attached cross piece of tube 12 on which a bracket 19 is swingably supported on a bolt 14 with a wing nut 13. This bolt forms a shaft through the ends of the bracket 19 and the cross tube 12. Attached to the cross tube 12 there is a flange 15 with holes 16 therein that are adapted to receive the integral extension 18 on the spring 17 that is attached by one end to the curved arm 20. This spring with its extension in one of any of the holes helps to hold, in conjunction with the wing nut 13, the curved arm in any desired position for use in holding the fishing rod. The curved arm 20 is provided with a loop 21 to hold the butt end of the rod while part of the handle of the rod rests in the slot 23 in the bracket 22 on the other end of the curved arm 20. This slot may be made any suitable shape to accommodate the various sizes of rods. The holder may be made of any material best suited for the purpose, but I have found light metal tube and other metal parts very satisfactory.

While I have shown and described the preferred embodiment of my invention, I do not wish to limit same to the exact and precise details of structure, but reserve the right to make all modifications and changes so long as I remain within the spirit and scope of the following claim.

Having described my invention I claim:

A fishing rod holder of the class described comprising; a U-shaped clamp, a groove in the body of the clamp, two extending arms integral with and leading from the groove and at right angle to each other, a piece of tube with one end swingably attached in the said groove and adapted to be set parallel with either of said extending arms, a sleeve positioned slidable on said tube and adapted to hold the tube parallel with and adjacent either of said extending arms, a wing handle integral with the sleeve; slits cut in the free end of said swingable tube; a second piece of tube with one end telescoped into the free end of the swingable tube, a clamping collar mounted around the said tubes and adapted by manual means to clamp the second tube within the swingable tube; a third piece of tube attached across the outer end of the second tube, a bracket swingably attached to the cross tube, a curved arm attached to the said swingable bracket, a loop portion formed on one end of the curved arm, a slot formed in the other end of the curved arm, a flange attached to the cross tube, a plurality of holes in the flange, a spring with one end thereof attached to the curved arm, an extension formed in and with the middle portion of the spring, the said spring extension adapted to be set into any hole in the said flange; a bolt positioned through the bracket on the cross tube and through the cross tube, a wing nut on the bolt, said bolt and nut adapted for clamping the bracket in any one of a plurality of positions on the cross tube.

JAMES A. ARWOOD.

REFERENCES CITED

The following references are of record in the file of this patent:

UNITED STATES PATENTS

| Number | Name | Date |
|---|---|---|
| 1,534,642 | Hoagland | Apr. 21, 1925 |
| 2,220,234 | Hadaway | Nov. 5, 1940 |